United States Patent
Mai

(10) Patent No.: US 11,223,119 B2
(45) Date of Patent: *Jan. 11, 2022

(54) MILLIMETER WAVE LTCC FILTER

(71) Applicant: AAC Technologies Pte. Ltd., Singapore (SG)

(72) Inventor: Jianchun Mai, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 11 days.

This patent is subject to a terminal disclaimer.

(21) Appl. No.: 16/711,377

(22) Filed: Dec. 11, 2019

(65) Prior Publication Data

US 2020/0212553 A1 Jul. 2, 2020

(30) Foreign Application Priority Data

Dec. 31, 2018 (CN) .......................... 201811650621.9

(51) Int. Cl.
  *H01P 1/208* (2006.01)
  *H01Q 1/38* (2006.01)
  (Continued)

(52) U.S. Cl.
  CPC .......... *H01Q 1/38* (2013.01); *H01P 1/20372* (2013.01); *H01Q 9/0414* (2013.01); *H01S 3/08* (2013.01)

(58) Field of Classification Search
  CPC ...... H01Q 1/38; H01Q 9/0414; H01Q 1/2283; H01P 1/20372; H01P 1/2088; H01S 3/08; H01L 2924/00014
  See application file for complete search history.

(56) References Cited

U.S. PATENT DOCUMENTS 9,865,928 B2 * 1/2018 Sudo ...................... H01Q 5/378
2004/0251992 A1 * 12/2004 Kim ......................... H01P 3/122
                                                                  333/208

(Continued)

FOREIGN PATENT DOCUMENTS

CN         109687071 A1    4/2019

OTHER PUBLICATIONS

1st Office Action dated Sep. 30, 2019 by SIPO in related Chinese Patent Application No. 201811650621.9 (6 Pages).

(Continued)

*Primary Examiner* — David E Lotter
(74) *Attorney, Agent, or Firm* — W&G Law Group

(57) ABSTRACT

A millimeter wave LTCC filter includes system ground layers, metallized vias, first and second probes, two adjacent ones of the system ground layers define one closed resonant cavity, each closed resonant cavity is provided with a plurality of metallized vias, and the metallized vias of different closed resonant cavities face right to each other, to form concentric hole structures; an aperture of each first metallized via is equal to an aperture of each fourth metallized via, and is smaller than an aperture of each second metallized via that is equal to an aperture of each third metallized via; one end of the first probe is inserted into the first closed resonant cavity and electrically connected with the first system ground layer, and the second probe is coaxially arranged with the first probe, and is inserted into the fourth closed resonant cavity and electrically connected with the second system ground layer.

8 Claims, 4 Drawing Sheets

(51) Int. Cl.
H01P 1/203 (2006.01)
H01Q 9/04 (2006.01)
H01S 3/08 (2006.01)

(56) References Cited

U.S. PATENT DOCUMENTS

| | | | | |
|---|---|---|---|---|
| 2012/0293279 A1* | 11/2012 | Gong | ............... | H01P 3/121 |
| | | | | 333/202 |
| 2013/0293279 A1* | 11/2013 | Seshita | ............ | H01L 27/1203 |
| | | | | 327/333 |
| 2015/0214594 A1* | 7/2015 | Zhou | ............... | H01P 1/20309 |
| | | | | 333/204 |
| 2017/0069943 A1* | 3/2017 | Chayat | ............ | H01P 1/20345 |
| 2020/0212531 A1* | 7/2020 | Mai | ............... | H01P 1/20318 |
| 2020/0212552 A1* | 7/2020 | Zhu | ............... | H01Q 1/48 |
| 2020/0212554 A1* | 7/2020 | Mai | ............... | H01S 3/08 |
| 2020/0212648 A1* | 7/2020 | Zhu | ............... | H01S 5/026 |

OTHER PUBLICATIONS

PCT search report dated Jan. 2, 2020 by SIPO in related PCT Patent Application No. PCT/CN2019/111286(4 Pages).

* cited by examiner

MILLIMETER WAVE LTCC FILTER

TECHNICAL FIELD

The present invention relates to an antenna, and more particularly, to a millimeter wave LTCC filter used in the field of communication electronic products.

BACKGROUND

The fifth generation mobile phone mobile communication standard is also known as the fifth generation mobile communication technology (5G). Future 5G networks are developing towards a direction of network diversification, broadband, integration and intelligence. With the popularization of various smart terminals, mobile data traffic explodes. With the gradual landing of 5G networks, the mobile phone communication band increases significantly.

The millimeter wave full-frequency band of the 5G communication includes 26.5~29.5 GHz and a relative bandwidth of 10.7%, and corresponding related millimeter wave radio frequency systems require good rejection performance out of a band of DC~60 GHz. The millimeter wave filter made by the LTCC process has higher integration, a smaller device dimension and a lower loss, but has strict requirements for processing of a metallized via.

Therefore, it is necessary to provide a new millimeter wave LTCC filter to solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will be further illustrated with reference to the accompanying drawings and the embodiments.

Figure 1:
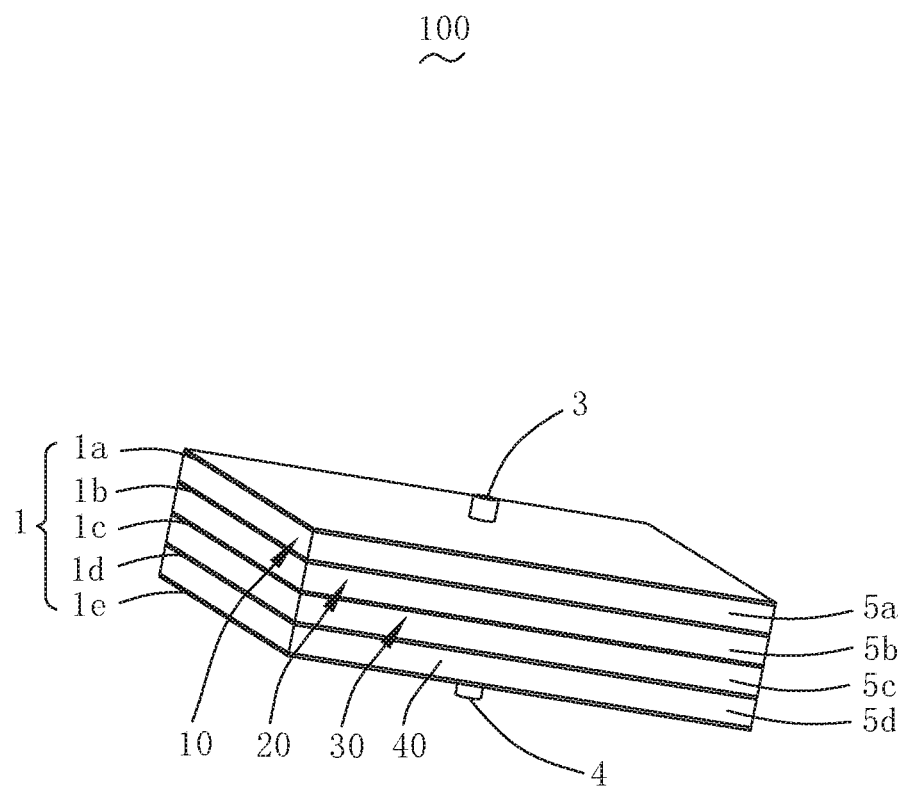
FIG. 1 is a perspective structural schematic diagram of a millimeter wave LTCC filter of the present invention.
Figure 2:
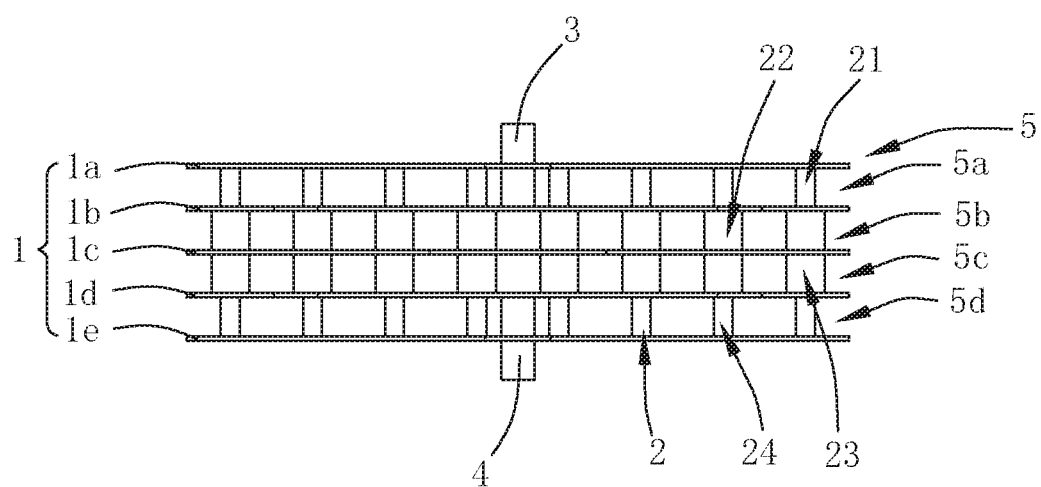
FIG. 2 is a partial perspective structural schematic diagram of a millimeter wave LTCC filter of the present invention.
Figure 3:
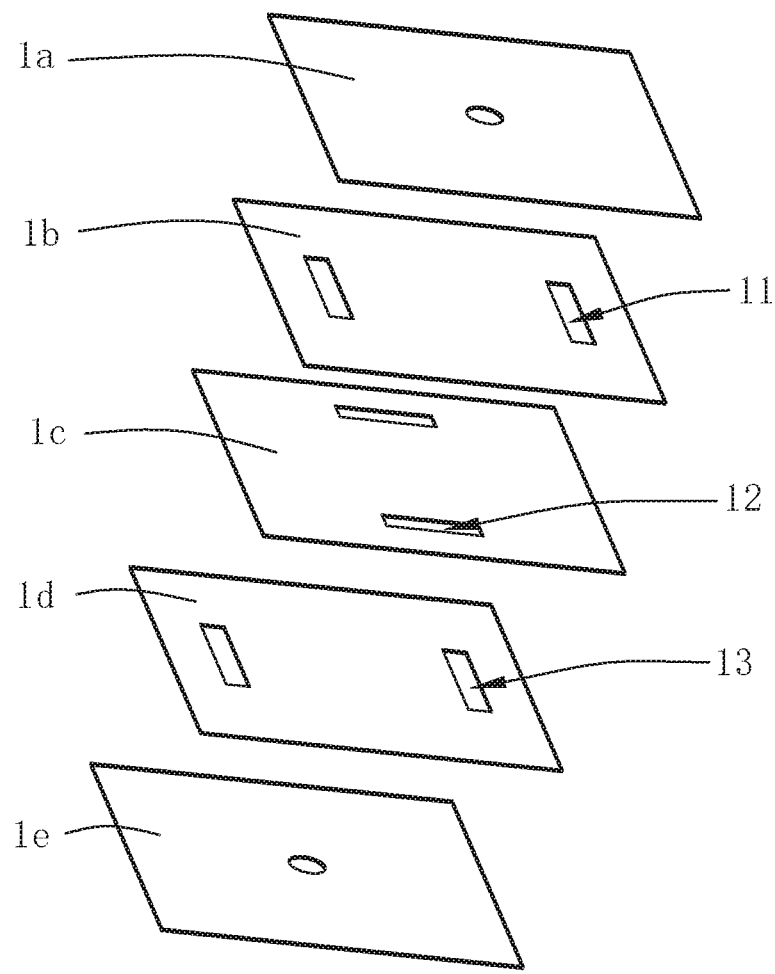
FIG. 3 is a structural schematic diagram of respective system ground layers of a millimeter wave LTCC filter of the present invention.

Referring to FIGS. 1-3, an embodiment of the present invention provides a millimeter wave LTCC filter 100. The millimeter wave LTCC filter 100 includes system ground layers 1, metallized vias 2, a first probe 3, and a second probe 4.

The system ground layers 1 include, sequentially stacked from top to bottom at intervals, a first system ground layer 1a, a second system ground layer 1b, a third system ground layer 1c, a fourth system ground layer 1d, and a fifth system ground layer 1e. In this embodiment, peripheral dimensions of the first system ground layer 1a, the second system ground layer 1b, the third system ground layer 1c, the fourth system ground layer 1d, and the fifth system ground layer 1e are the same, and for example, they are all rectangles of the same size.

In this embodiment, the millimeter wave LTCC filter further includes a substrate layer sandwiched between two adjacent ones of the system ground layers, and the substrate layer is made of an LTCC material.

Two adjacent layers of the system ground layers 1 define one closed resonant cavity 5. Five layers of the system ground layers 1 sequentially define, from top to bottom, a first closed resonant cavity 5a, a second closed resonant cavity 5b, a third closed resonant cavity 5c, and a fourth closed resonant cavity 5d, which have the same peripheral dimension.

The metallized vias 2 include, in a stacking direction of the system ground layers 1, a plurality of first metallized vias 21 penetrating the first closed resonant cavity 5a, a plurality of second metallized vias 22 penetrating the second closed resonant cavity 5b, a plurality of third metallized vias 23 penetrating the third closed resonant cavity 5c, and a plurality of fourth metallized vias 24 penetrating the fourth closed resonant cavity 5d. The plurality of first metallized vias 21, the plurality of second metallized vias 22, the plurality of third metallized vias 23, and the plurality of fourth metallized vias 24 are arranged right facing to one another. That is, the metallized vias 2 of the respective closed resonant cavities 5 are concentric hole structures.

In an embodiment, an aperture of the first metallized via 21 is equal to an aperture of the fourth metallized via 24, an aperture of the second metallized via 22 is equal to an aperture of the third metallized via 23, and the aperture of the first metallized via 21 is smaller than the aperture of the second metallized via 22. The provision of the above structure adjusts sizes of the apertures of the metallized vias of the different closed resonant cavities 5 and changes equivalent dimensions of the respective closed resonant cavities 5, that is, the metallized vias 2 of the same closed resonant cavity 5 having the same intervals are changed smaller, the equivalent dimensions of the closed resonant cavities are increased, and a self-resonant mode of the closed resonant cavities is changed, thereby achieving a larger bandwidth.

Specifically, a center-to-center distance between two adjacent ones of the first metallized vias 21 is smaller than 2 to 2.5 times the aperture of each of the first metallized vias 21; a center-to-center distance of two adjacent ones of the second metallized vias 22 is smaller than 2 to 2.5 times the aperture of each of the second metallized vias 22; a center-to-center distance of two adjacent ones of the third metallized vias 23 is smaller than 2 to 2.5 times the aperture of each of the third metallized vias 23; and a center-to-center distance of two adjacent ones of the fourth metallized vias 24 is smaller than 2 to 2.5 times the aperture of each of the fourth metallized vias 24.

The first metallized vias 21 and the first closed resonant cavity 5a form a first substrate integrated waveguide unit 10. The second metallized vias 22 and the second closed resonant cavity 5b form a second substrate integrated waveguide unit 20. The third metallized vias 23 and the third closed resonant cavity 5c form a third substrate integrated waveguide unit 30. The fourth metallized vias 24 and the fourth closed resonant cavity 5d form a fourth substrate integrated waveguide unit 40.

In an embodiment, the first closed resonant cavity 5a is of a rectangular structure, and the plurality of first metallized vias 21 are equally spaced along a circumference of the first closed resonant cavity 5a, to define, for example, a rectangular structure.

The second closed resonant cavity 5b is of a rectangular structure, and the plurality of second metallized vias 22 are equally spaced along a circumference of the second closed resonant cavity 5b, to define, for example, a rectangular structure.

The third closed resonant cavity 5c is of a rectangular structure, and the plurality of third metallized vias 23 are equally spaced along a circumference of the third closed resonant cavity 5c, to define, for example, a rectangular structure.

The fourth closed resonant cavity 5d is of a rectangular structure, and the plurality of fourth metallized vias 24 are equally spaced along a circumference of the fourth closed resonant cavity 5d, to define, for example, a rectangular structure.

In combination with FIG. 3, in an embodiment, two opposite ends of the second system ground layer 1b are respectively provided with two second rectangular through holes 11 that penetrate therethrough and are arranged symmetrically. The two second rectangular through holes 11 are located in a region defined by the second metallized vias 22.

Two opposite ends of the third system ground layer 1c are respectively provided with two third rectangular through holes 12 that penetrate therethrough and are arranged symmetrically. The two third rectangular through holes 12 are located in a region defined by the third metallized vias 23, and the second rectangular through holes 11 and the third rectangular through holes 12 are staggered.

The fourth system ground layer 1d has the same structure as the second system ground layer 1b and is provided with two fourth rectangular through holes 13 which are symmetrical. The two fourth rectangular through holes 13 are disposed right facing the two second rectangular through holes 11.

The first closed resonant cavity 5a communicates with the second closed resonant cavity 5b through the second rectangular through holes 11. The second closed resonant cavity 5b communicates with the third closed resonant cavity 5c through the third rectangular through holes 12. The third closed resonant cavity 5c communicates with the fourth closed resonant cavity 5d through the fourth rectangular through holes 13.

In an embodiment, the two second rectangular through holes 11 are respectively located on two opposite sides of a short axis of the second system ground layer 1b, and the second rectangular through holes 11 extend along a short axis direction of the second system ground layer 1b; the two third rectangular through holes 12 are respectively located on two opposite sides of a long axis of the third system ground layer 1c, and the third rectangular through holes 12 extend along a long axis direction of the third system ground layer 1c.

One end of the first probe 3 is inserted into the first closed resonant cavity 5a to form a feed structure.

The second probe 4 is arranged symmetrically with the first probe 3, and one end of the second probe 4 is inserted into the fourth closed resonant cavity 5d to form a feed structure. The above structure can be excited by the first probe 3 and the second probe 4 cooperating with a coaxial line respectively, and achieve a greater bandwidth, a smaller loss, and an easier interconnection with ceramic packaged microstrip antennas, thereby allowing an insertion loss of the millimeter wave LTCC filter of the present invention to be reduced from 1.8 dB to 1 dB compared to the structure in the related art.

In another embodiment, the first probe 3 is inserted into the first closed resonant cavity 5a from a geometric center of the first closed resonant cavity 5a and reaches the second system ground layer 1b in the first closed resonant cavity 5a, and specifically, it is inserted from a geometric center of the first system ground layer 1a; and the second probe 4 is inserted into the fourth closed resonant cavity 5d from a geometric center of the fourth closed resonant cavity 5d and reaches the fourth system ground layer 1d in the fourth closed resonant cavity 5d, and specifically, it is inserted from a geometric center of the fifth system ground layer 1e.

Figure 4:
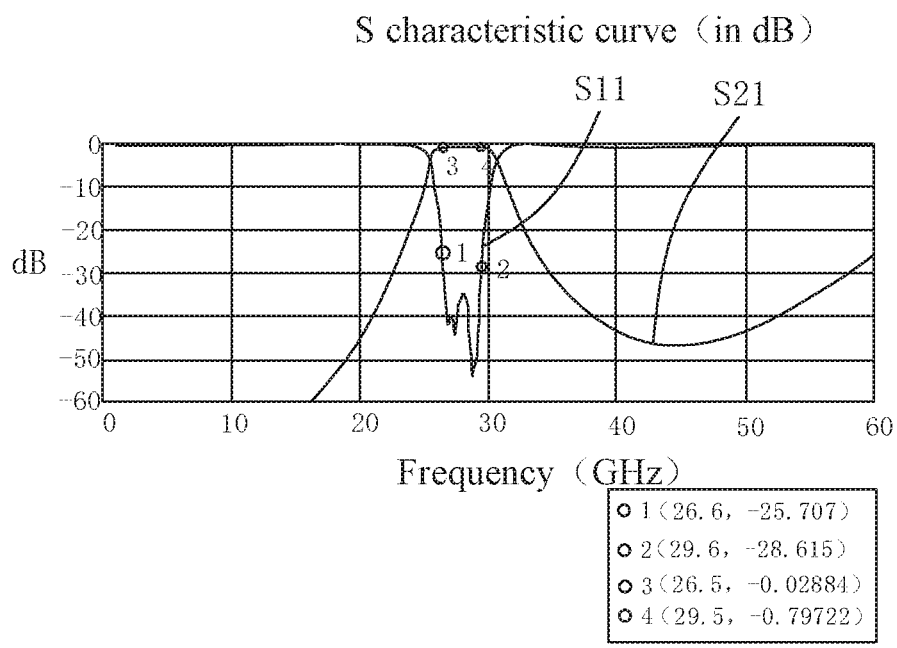
FIG. 4 illustrates an S characteristic parameter curve of a millimeter wave LTCC filter of the present invention.

In combination with FIG. 4, S11 is a port reflection coefficient of the millimeter wave LTCC filter of the present invention, and S21 is a transmission coefficient. The millimeter wave LTCC filter of the present invention has excellent performance, e.g., the insertion loss is smaller than 1 dB (S21 is larger than −1 dB), and most of the out-of-band rejection is smaller than −30 dB, which meets requirements of the RF front end of the 5G millimeter wave communication system.

Compared with the related art, it is configured in the millimeter wave LTCC filter of the present invention that the respective closed resonant cavities have equal dimensions and the apertures of the metallized vias provided in the respective closed resonant cavities are adjusted in such a manner that equivalent dimensions of the respective closed resonant cavities are changed, the metallized vias having the same intervals are changed smaller, increase the equivalent dimensions of the closed resonant cavity are increased and a self-resonant mode of the closed resonant cavities is changed, thereby achieving a larger bandwidth and a smaller loss, which meets the requirements of the RF front end of the 5G millimeter wave communication system.

The above are only embodiments of the present invention and are not intended to limit the present invention. Any equivalent structures or equivalent flow variations, or direct or indirect applications in other related technical fields made by using the description and accompanying drawings of the present invention shall fall within the protection scope of the present invention.

What is claimed is:

1. A millimeter wave LTCC filter, comprising:
system ground layers comprising a first system ground layer, a second system ground layer, a third system ground layer, a fourth system ground layer, and a fifth system ground layer that are sequentially stacked from top to bottom at intervals, wherein two adjacent layers of the system ground layers define a closed resonant cavity, and five layers of the system ground layers sequentially define, from top to bottom, a first closed resonant cavity, a second closed resonant cavity, a third closed resonant cavity, and a fourth closed resonant cavity that have same peripheral dimensions and communicate with each other;
metallized vias comprising, in a direction in which the system ground layers are stacked, a plurality of first metallized vias penetrating the first closed resonant cavity, a plurality of second metallized vias penetrating the second closed resonant cavity, a plurality of third metallized vias penetrating the third closed resonant cavity, and a plurality of fourth metallized vias penetrating the fourth closed resonant cavity, wherein the plurality of first metallized vias, the plurality of second metallized vias, the plurality of third metallized vias, and the plurality of fourth metallized vias face right to each other to form concentric hole structures; an aperture of each of the plurality first metallized vias is equal to an aperture of each of the plurality of fourth metallized vias, and is smaller than an aperture of each of the plurality of second metallized vias that is equal to an aperture of each of the plurality of third metallized vias; the plurality of first metallized vias and the first closed resonant cavity form a first substrate integrated waveguide unit, the plurality of second metallized vias and the second closed resonant cavity form a second substrate integrated waveguide unit, the plurality of third metallized vias and the third closed resonant cavity form a third substrate integrated waveguide unit, and the plurality of fourth metallized vias and the fourth closed resonant cavity form a fourth substrate integrated waveguide unit;

a first probe having one end inserted into the first closed resonant cavity and reaching the system ground layer in the first closed resonant cavity; and a second probe arranged coaxially with the first probe and having one end inserted into the fourth closed resonant cavity.

2. The millimeter wave LTCC filter as described in claim 1, wherein the first closed resonant cavity is of a rectangular structure, and the plurality of first metallized vias is equally spaced along a circumference of the first closed resonant cavity; the second closed resonant cavity is of a rectangular structure, and the plurality of second metallized vias is equally spaced along a circumference of the second closed resonant cavity; the third closed resonant cavity is of a rectangular structure, and the plurality of third metallized vias is equally spaced along a circumference of the third closed resonant cavity; and the fourth closed resonant cavity is of a rectangular structure, and the plurality of fourth metallized vias is equally spaced along a circumference of the fourth closed resonant cavity.

3. The millimeter wave LTCC filter as described in claim 2, wherein the first probe is inserted into the first closed resonant cavity from a geometric center of the first closed resonant cavity; and the second probe is inserted into the fourth closed resonant cavity from a geometric center of the fourth closed resonant cavity.

4. The millimeter wave LTCC filter as described in claim 2, wherein a center-to-center distance between two adjacent ones of the plurality of first metallized vias is smaller than 2 to 2.5 times the aperture of each of the plurality of first metallized vias; a center-to-center distance of two adjacent ones of the plurality of second metallized vias is smaller than 2 to 2.5 times the aperture of each of the plurality of second metallized vias; a center-to-center distance of two adjacent ones of the plurality of third metallized vias is smaller than 2 to 2.5 times the aperture of each of the plurality of third metallized vias; and a center-to-center distance of two adjacent ones of the plurality of fourth metallized vias is smaller than 2 to 2.5 times the aperture of each of the plurality of fourth metallized vias.

5. The millimeter wave LTCC filter as described in claim 2, wherein two opposite ends of the second system ground layer are respectively provided with two second rectangular through holes that penetrate therethrough and are arranged symmetrically with each other; two opposite ends of the third system ground layer are respectively provided with two third rectangular through holes that penetrate therethrough and are arranged symmetrically with each other; the fourth system ground layer is of a same structure as the second system ground layer and is provided with two fourth rectangular through holes that are symmetrical with each other; the first closed resonant cavity communicates with the second closed resonant cavity through the two second rectangular through holes, the second closed resonant cavity communicates with the third closed resonant cavity through the two third rectangular through holes, and the third closed resonant cavity communicates with the fourth closed resonant cavity through the two fourth rectangular through holes.

6. The millimeter wave LTCC filter as described in claim 5, wherein the two second rectangular through holes are located in a region defined by the plurality of second metallized vias; the two third rectangular through holes are located in a region defined by the plurality of third metallized vias, and the two second rectangular through holes and the two third rectangular through holes are staggered.

7. The millimeter wave LTCC filter as described in claim 6, wherein the two second rectangular through holes are respectively located on two opposite sides of a short axis of the second system ground layer; and the two third rectangular through holes are respectively located on two opposite sides of a long axis of the third system ground layer.

8. The millimeter wave LTCC filter as described in claim 1, further comprising a substrate layer sandwiched between two adjacent ones of the system ground layers, wherein the substrate layer is made of an LTCC material.

* * * * *